US011097588B2

United States Patent
Tuhro et al.

(10) Patent No.: US 11,097,588 B2
(45) Date of Patent: Aug. 24, 2021

(54) VEHICLE OSCILLATION CONTROL BY SWITCHABLE AIR VOLUME SUSPENSION

(71) Applicant: Continental Automotive Systems, Inc., Auburn Hills, MI (US)

(72) Inventors: Matthew Conrad Tuhro, Sault Ste. Marie, MI (US); Daniel Gregory Goodrich, Cedarville, MI (US); Patrick Alan Crane, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 80 days.

(21) Appl. No.: 16/199,339

(22) Filed: Nov. 26, 2018

(65) Prior Publication Data

US 2020/0164711 A1 May 28, 2020

(51) Int. Cl.
*B60G 17/016* (2006.01)
*B60G 17/052* (2006.01)
(Continued)

(52) U.S. Cl.
CPC ....... *B60G 17/0523* (2013.01); *B60G 17/019* (2013.01); *B60G 17/0155* (2013.01); *B60G 2202/152* (2013.01); *B60G 2400/0511* (2013.01); *B60G 2400/0512* (2013.01); *B60G 2400/0513* (2013.01); *B60G 2400/0521* (2013.01); *B60G 2400/0522* (2013.01); *B60G 2400/0523* (2013.01); *B60G 2400/104* (2013.01); *B60G 2400/106* (2013.01); *B60G 2400/204* (2013.01); *B60G 2400/208* (2013.01); *B60G 2500/201* (2013.01); *B60G 2500/22* (2013.01)

(58) Field of Classification Search
CPC ... F16F 9/049; B60G 17/0521; B60G 17/052; B60G 17/0525; B60G 11/27; B60G 2400/252; B60G 2800/914; B60G 2202/152; B60G 2500/30; B60G 2202/412; B60G 2206/424
USPC ......... 280/5.506, 5.507, 5.509, 5.512, 5.513, 280/124.157, 124.159, 124.16, 124.161
See application file for complete search history.

(56) References Cited

U.S. PATENT DOCUMENTS 5,513,108 A * 4/1996 Kishimoto ......... B60G 17/0162
701/38
6,427,986 B1 * 8/2002 Sakai ..................... B60G 15/14
188/266.6

(Continued)

*Primary Examiner* — Toan C To

(57) ABSTRACT

An air suspension system which includes the ability to adjust the working air volume, pressure, and spring rate of one or more air springs to reduce or eliminate various types of vehicle oscillations. Switchable or variable volume air spring assemblies have the ability to change air spring volumes, which results in changes in air spring rates, and therefore changes in normal loads applied to each wheel. Changes in wheel normal loads change wheel traction (slip) and vehicle dynamics (pitch, roll, yaw displacement, rate and acceleration). The spring rate of one or more of the air spring assemblies is adjusted automatically when a vehicle oscillation is detected. This vehicle oscillation is calculated from the raw vehicle signals, or another vehicle module may detect the oscillation and send a command to the air suspension module to change the spring rates. This changes the natural frequency of the vehicle, dampening the oscillation.

12 Claims, 4 Drawing Sheets

(51) Int. Cl.
*B60G 17/019* (2006.01)
*B60G 17/015* (2006.01)

(56) References Cited

U.S. PATENT DOCUMENTS

| | | | | |
|---|---|---|---|---|
| 6,698,730 B2 * | 3/2004 | Easter | ............... | B60G 17/0528 |
| | | | | 267/64.28 |
| 8,868,294 B2 * | 10/2014 | Gambrall | ........... | B60G 17/0155 |
| | | | | 280/5.5 |
| 8,899,603 B2 * | 12/2014 | VanRaaphorst | .... | B60G 17/0155 |
| | | | | 267/64.23 |
| 2006/0108749 A1 * | 5/2006 | Kim | ....................... | B60G 15/12 |
| | | | | 280/5.508 |
| 2007/0200304 A1 * | 8/2007 | Brookes | ............... | B60G 21/106 |
| | | | | 280/5.514 |
| 2008/0079280 A1 * | 4/2008 | Nakamura | ......... | B60G 17/0523 |
| | | | | 296/35.3 |
| 2013/0099459 A1 * | 4/2013 | Remboski | .............. | B60G 11/27 |
| | | | | 280/124.16 |
| 2013/0207355 A1 * | 8/2013 | Pavuk | .................... | F16F 9/049 |
| | | | | 280/5.512 |

\* cited by examiner

VEHICLE OSCILLATION CONTROL BY SWITCHABLE AIR VOLUME SUSPENSION

FIELD OF THE INVENTION

The invention relates generally to an air suspension system which includes air spring assemblies having multiple air volumes, where the air volume of each air spring assembly may be adjusted automatically to reduce or eliminated various types of vehicle oscillations.

BACKGROUND OF THE INVENTION

OEM companies which manufacture automotive vehicles typically select suspension and driveline components which offer the best compromise of comfort and performance. Suspension systems for automotive vehicles provide vehicle passengers with a more comfortable ride. Air suspension systems utilize air springs, rather than traditional coil springs, and provide different suspension qualities that may be preferable to traditional coil spring suspensions in some vehicles.

A conventional air spring is a device that is arranged between a vehicle body and chassis, such that the air spring applies what is referred to as a "normal load" to a respective wheel. The typical air spring has at least one working space, or cavity that is filled with compressed air generated by a compressor. Some air springs have multiple cavities, which may be of different sizes, such that one or more of the cavities may be used as the working space of the air spring assembly. The cavity or cavities filled with compressed air at least partially fills a bellow, and other surrounding areas. There are also air suspension systems in which the air pressure is adjustable such that the ride height of the vehicle and the spring rate of each air spring may be adjusted. Some air suspension systems are used with vehicles having off-road capability. These off-road vehicles often operate under conditions where the suspension jounce is maximized, and the pressure in each air spring increases during compression travel. Some components in the vehicle may allow vehicle and driveline oscillations to occur in extreme maneuvers. These oscillations may be mitigated with a different spring rate, but result in reduced ride comfort, which is undesirable to the driver of the vehicle.

There are different types of vehicle oscillations which may occur, one type of oscillation is referred to as "roll hop." Roll hop is the oscillation of a vehicle along its longitudinal axis. This occurs during high dynamic lateral maneuvers, such as emergency lane changes. If uncontrolled, the roll hop may result in vehicle rollovers and failure to meet federal roll over mitigation requirements.

Another type of vehicle oscillation is referred to as "trailer sway." Trailer sway is the oscillation of the vehicle around its yaw axis. This occurs when the vehicle is towing an improperly balanced trailer, and exceeds the critical damping speed of the system. The critical damping speed of a vehicle/trailer is primarily a function of vehicle cornering stiffness, trailer loading, mass, and trailer/vehicle geometry.

Yet another type of vehicle oscillation is referred to as "powerhop." Powerhop is the torsional oscillation of the vehicle driveline, during acceleration events. Powerhop occurs when one or more tires loses and regains traction in a repetitive fashion.

Another type of vehicle oscillation is referred to as "pitch oscillation." Pitch oscillation is the oscillation around the lateral axis of the vehicle. Pitch oscillation occurs during braking or accelerating events.

Some air suspension systems have the capability to adjust the air mass (which is a product of pressure and volume) in each air spring to increase both the ride height and the spring rate. However, current air suspension systems are typically adjusted by the driver, and do not have the ability to adjust ride height or spring rate to reduce or eliminate various vehicle oscillations, and are not adjusted automatically.

Accordingly, there exists a need for the ability to use multiple cavities in an air spring assembly to change the vehicle dynamic, and reduce different types of vehicle oscillations.

SUMMARY OF THE INVENTION

In one embodiment, the present invention is an air suspension system which includes the ability to adjust the working air volume, pressure, and spring rate of one or more air springs to reduce or eliminate various types of vehicle oscillations. Switchable or variable volume air spring assemblies have the ability to change air spring volumes. These changes in air spring volumes result in changes in air spring rates, which result in changes in normal loads applied to each wheel. Changes in wheel normal loads change wheel traction (slip) and vehicle dynamics (pitch, roll, yaw displacement, rate and acceleration).

In one embodiment, the spring rate of one or more of the air spring assemblies is adjusted automatically when a vehicle oscillation is detected. This vehicle oscillation may either be calculated from the raw vehicle signals (yaw, roll, pitch, wheel speeds, etc.), or another vehicle module may detect the oscillation and send a command to the air suspension module to change (increase or decrease) the spring rates. This changes the natural frequency of the vehicle, causing the oscillation to dampen out.

In one embodiment, the present invention is an air suspension system of a vehicle having a vehicle oscillation function, where the air suspension system includes at least one air spring assembly having a plurality of spring rates, a plurality of cavities which are part of the air spring assembly, and at least one valve operable for placing one or more of the cavities in fluid communication with one another. During travel of the vehicle, the air spring assembly is operating at a first spring rate, and the air spring assembly is configured for operating at a second spring rate upon detection of a vehicle oscillation.

In one embodiment, the second spring rate is higher than the first spring rate, and in another embodiment, the second spring rate is lower than the first spring rate.

In one embodiment, the magnitude of the second spring rate is based on one or more inputs. In one embodiment, the inputs are one or more vehicle inputs, but it is within the scope of the invention that other types of inputs may be used. The vehicle inputs may include, but are not limited to vehicle speed, vehicle acceleration, lateral acceleration, wheel speed, pitch, roll, yaw displacement, yaw rate, wheel acceleration, pitch rate, roll rate, lateral displacement, suspension displacement, and suspension displacement rate.

In one embodiment, the air suspension system includes a compressor, and at least one additional valve in fluid communication with at least one of the plurality of cavities and the compressor. The compressor is used with the valve and the at least one additional valve to control the pressure in the plurality of cavities, configuring the air spring to operate at the second spring rate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
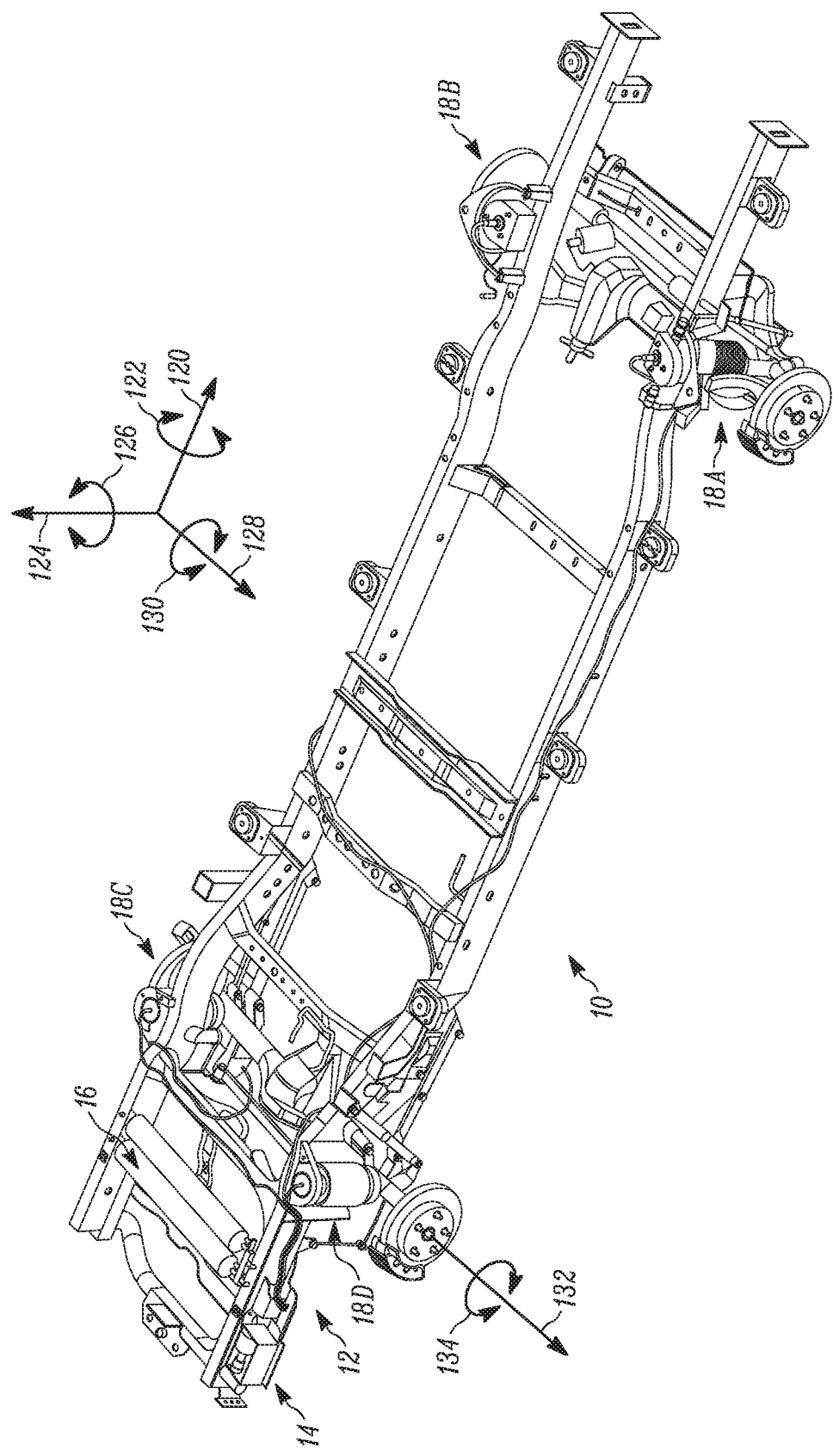
FIG. 1 is a perspective view of various components of a vehicle used as part of an air suspension system having a vehicle oscillation reducing function, according to embodiments of the present invention.

A chassis of a vehicle having an air suspension system having the ability to reduce vehicle oscillation is shown in FIG. 1 generally at 10. The air suspension system, shown generally at 12, includes an air compressor 14, which is in fluid communication with a reservoir, shown generally at 16, and the air compressor 14 is also in fluid communication with four air spring assemblies 18A-18D. Each of the air spring assemblies 18A-18D is used for absorbing impact during travel of the vehicle, and each air spring assembly 18A-18D is a multi-chamber air spring assembly 18A-18D, having different spring rates. A sectional view of the first air spring assembly 18A is shown in FIG. 2, however, it is within the scope of the invention that the remaining air spring assemblies 18B-18D have similar components.

Figure 2:
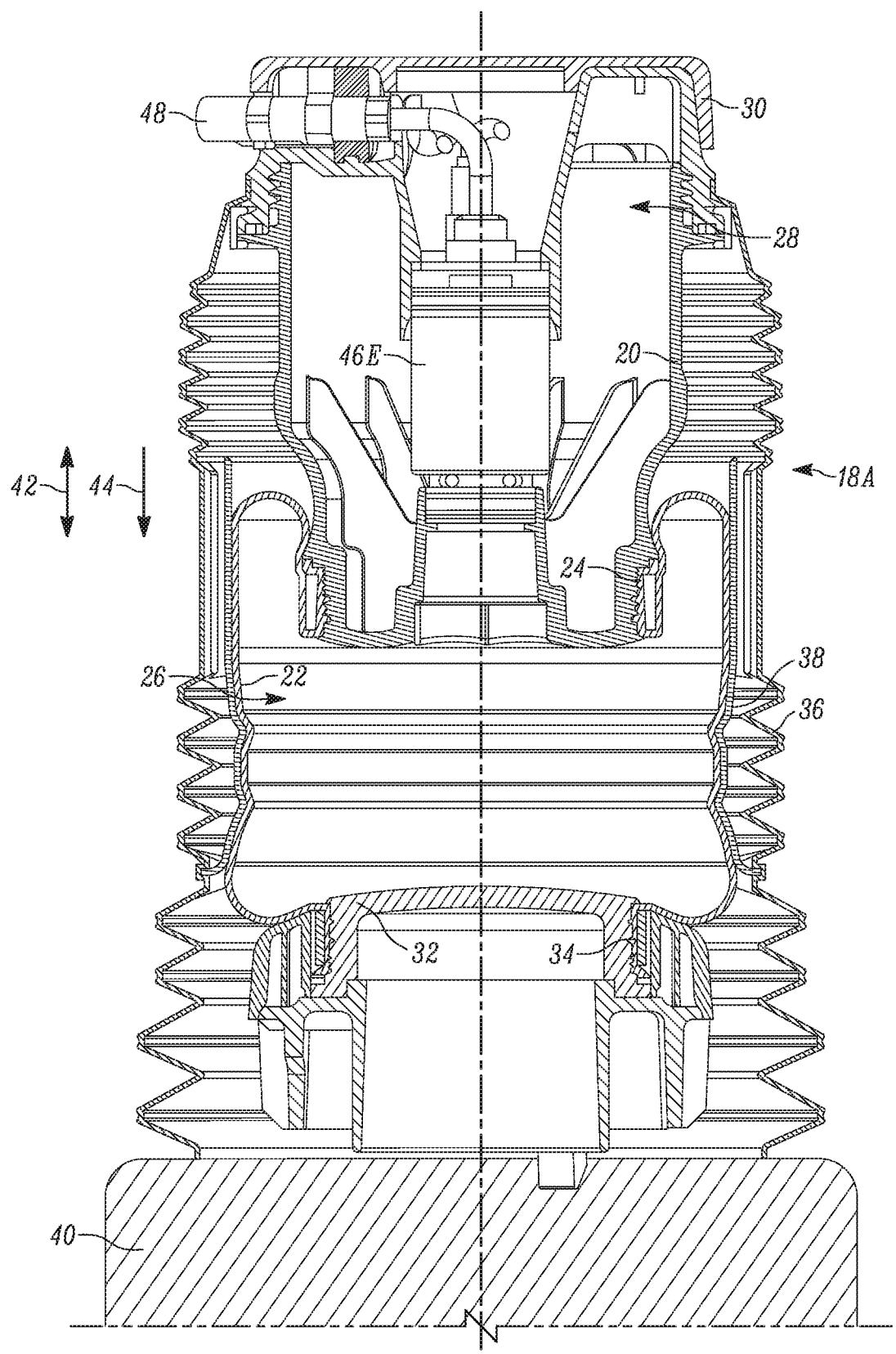
FIG. 2 is a sectional view of an air spring assembly used as part of an air suspension system having a vehicle oscillation reducing function, according to embodiments of the present invention.

Referring now to FIG. 2, the air spring assembly 18A includes an inner piston 20, and a bellow 22, where a first end 24 of the bellow 22 is connected to the inner piston 20. The bellow 22 is flexible and able to change shape during vehicle travel. The bellow 22 includes a cavity, shown generally at 26, which is generally filled with air, and is selectively in fluid communication with another cavity, shown generally at 28, formed as part of the inner piston 20.

The inner piston 20 includes an upper housing portion 30, and the upper housing portion 30 is connected to another component of a vehicle, such the frame (not shown) of the vehicle, but it is within the scope of the invention that the upper housing portion 30 may be connected to other components of the vehicle as well.

The air spring assembly 18A in this embodiment also includes a lower cap portion 32. Another free end 34 of the bellow 22 is connected to the lower cap portion 32. The cavities 26,28 define two separate volumes of air, where the volume of air in the first cavity 26 may change during vehicle travel, as the lower cap portion 32 moves relative to the inner piston 20.

The air spring assembly 18A also includes a gaiter 36, shown in FIG. 2, which is connected to an outer shield 38 and the inner piston 20. The outer shield 38 is also connected to the bellow 22. The gaiter 36 provides protection for the air spring assembly 10 against dirt and debris during vehicle travel.

The lower cap portion 32 is connected to another part of the suspension system of the vehicle, such as the vehicle axle 40. As the axle 40 moves from (operation of the vehicle) the lower cap portion 32 moves along the vertical path indicated by the arrow 42, which corresponds to the articulation of the axle 40 relative to the rest of the vehicle, and the volume of the cavity 26 changes during vehicle travel, as the lower cap portion 32 moves in the direction indicated by the vertical path 42. The air spring assembly 18A also applies a force in the direction of arrow 44, which is transferred to the corresponding wheel (not shown). The force applied in the direction indicated by arrow 44 is the "normal load" applied to the wheel by the air spring assembly 18A.

Disposed within the cavity 28 of the inner piston 20 is a secondary valve 46E, and the secondary valve 46E is able to control the flow of air between the cavity 28 of the inner piston 20 and the cavity 26 of the bellow 22, such that when the secondary valve 46E is in a closed position, the cavity 26 of the bellow 22 acts as a first air volume, and the cavity 28 of the inner piston 20 acts as a second air volume, and the cavities 26,28 are isolated from one another. As mentioned above, the air spring assembly 18A shown in FIG. 2 is a multi-chamber air spring assembly 18A, having different spring rates. A stiffer spring rate is achieved by reducing the air volume, which occurs when the secondary valve 46E is in a closed position, such that only the air volume in the cavity 26 of the bellow 22 affects the spring rate of the air spring assembly 18A. A lower spring rate is achieved by increasing the air volume, which occurs when the secondary valve 46E is in an open position such that the air volume in both the cavity 28 of the inner piston 20 and the cavity 26 of the bellow 22 affect the spring rate of the air spring assembly 18A. The secondary valve 46E is in fluid communication with a fitting 48, as shown in FIG. 2.

Figure 3:
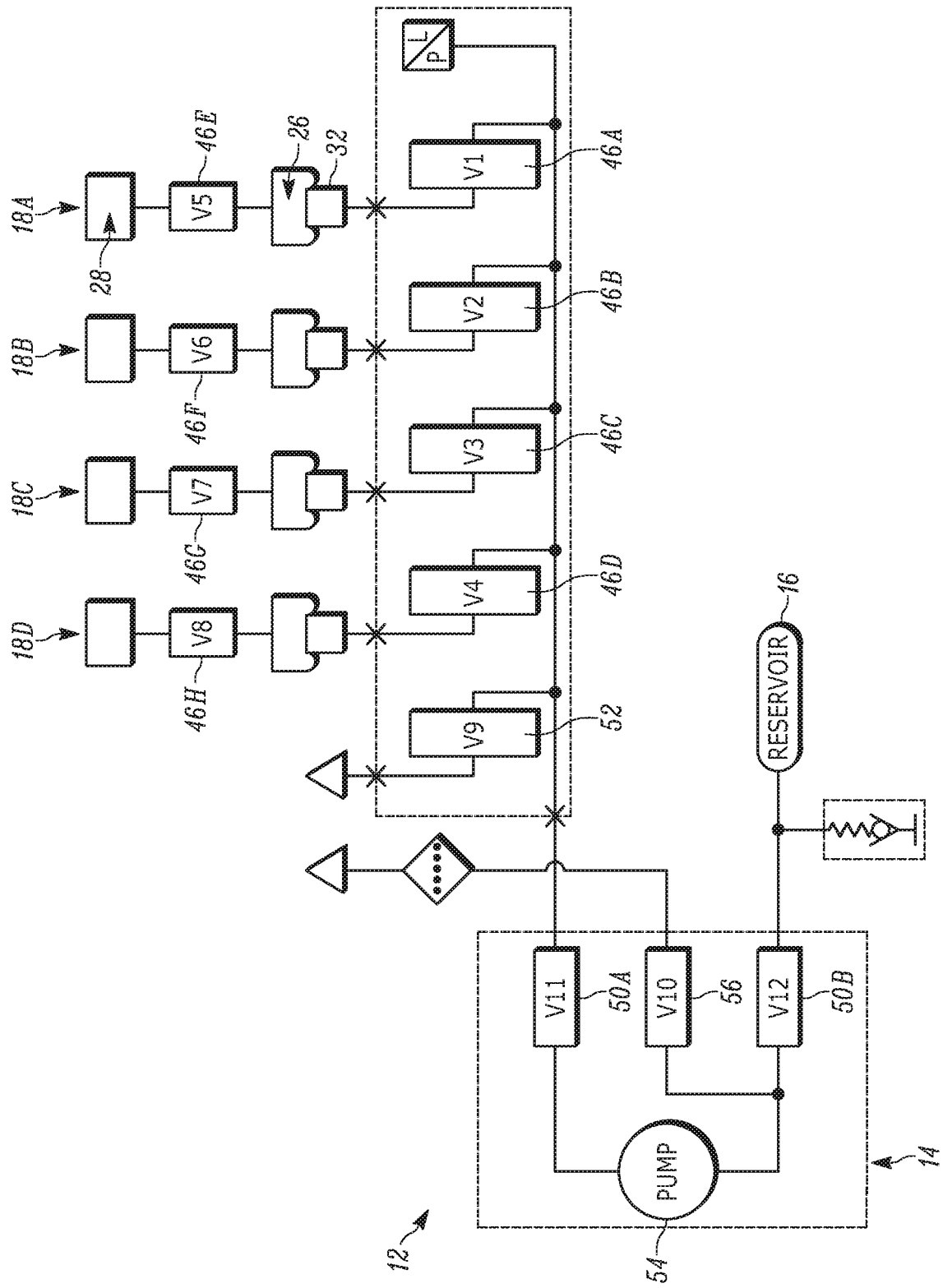
FIG. 3 is a diagram of an air suspension system having a vehicle oscillation reducing function, according to embodiments of the present invention.

Referring now to FIG. 3, a schematic of the air suspension system 12 is shown, including several valves along with the air compressor 14, and the reservoir 16, which are part of the air suspension system 12. The fitting 48 is in fluid communication with one of the valves. More specifically, the fitting 48 (shown in FIG. 2) is in fluid communication with a first valve 46A (shown in FIG. 3), and the first valve 46A is in fluid communication with a first control valve 50A, which is part of the air compressor 14. The first valve 46A allows or prevents air flow into the cavities 26,28. There are additional valves 46B,46C,46D shown in FIG. 3, which control the flow of air into the corresponding air volumes for each of the additional air spring assemblies 18B,18C,18D, where the lower cap portion 32 and air volume of each air spring assembly is shown schematically in FIG. 3. There is also a venting valve 52 in fluid communication with each of the valves 46A,46B,46C,46D,50A and in fluid communication with the atmosphere. Each of the valves 46A,46B,46C,46D is in fluid communication with both the venting valve 52 and the first control valve 50A.

The air compressor 14 also includes a second control valve 50B, the second control valve 50B is in fluid communication with the reservoir 16, and both the control valves 50A,50B are in fluid communication with a pump 54. While is it shown that each of the control valves 50A,50B are part of the air compressor 14, it is within the scope of the invention that each of the control valves 50A,50B may be located in a separate housing, in a separate location from the air compressor 14, while still performing the same function. The air compressor 14 also includes another valve 56, which is in fluid communication with the pump 54, the second control valve 50B, and the atmosphere.

During travel of the vehicle, the air compressor 14 and the valves 46A,46E are used to configure the air pressure in the cavities 26,28, such that the air spring assembly 18A provides the desired ride quality, and the vehicle is traveling at the desired ride height. If the secondary valve 46E is in the closed position, the ride quality and ride height is determined by the pressure in the cavity 26 of the bellow 22 only. If the secondary valve 46E is in the open position, the ride quality and ride height is determined by the pressure in the combined volume of the cavity 26 of the bellow 22 the cavity 28 of the inner piston 20.

Referring now to the schematic in FIG. 3, multiple modes of operation of the air suspension system 12 may be used to change the working volume of air in the first air spring assembly 18A. In one mode of operation, the secondary valve 46E is in a closed position, and the first valve 46A, and the control valves 50A,50B are all energized, such that the first valve 46A and the control valves 50A,50B are placed in an open position, and the remaining valves 46B,46C,46D, 52,56 are in a closed position. This allows air in the cavity 26 of the bellow 22 to pass through the first valve 46A, through the first control valve 50A, the pump 54, the second control valve 50B, and into the reservoir 16, reducing pressure in the cavity 26 of the bellow 22. Conversely, the second control valve 50B may be placed in a closed position, while the other valves 46A,50A remain in the open position, and the pump 54 is actuated such that air is pumped through the first control valve 50A, through the first valve 46A, and into the cavity 26, increasing pressure in the cavity 26. The valves 46A,50A,50B may be opened or closed and used in combination with the pump 54 at any time during operation of the vehicle when it is desired to increase or decrease the pressure in the cavity 26 of the bellow 22 of the first air spring assembly 18A.

Another example of a different mode of operation of the air suspension system 12 is where the air suspension system 12 is configured to change the working volume of air to reduce pressure in the first air spring assembly 18A. In this mode of operation, the secondary valve 46E is again in a closed position, and the first valve 46A and the venting valve 52 are both energized, such that the first valve 46A and the venting valve 52 are both in an open position, and the remaining valves 46B,46C,46D,50A,50B,56 are in a closed position. This allows air in the cavities 26,28 to pass through the first valve 46A, through the venting valve 52, and into the atmosphere. The valves 46A,52 may be opened at any time during operation of the vehicle when it is desired to reduce pressure in the cavity 26 of the bellow 22 of the first air spring assembly 18A.

In yet another mode of operation of the air suspension system 12, the air suspension system 12 is again configured to reduce pressure in the first air spring assembly 18A such that if it is desired to reduce the pressure in the cavity 26 of the bellow 22 of the first air spring assembly 18A, in the example shown in FIG. 3, the secondary valve 46E, is energized, such that the secondary valve 46E is placed in an open position, and the remaining valves 46A,46B,46C,46D, 50A,50B,52,56 are in a closed position. This allows air in the cavity 26 of the bellow 22 to pass into the cavity 28 of the inner piston 20, such that the cavity 28 of the inner piston 20 and the cavity 26 of the bellow function together as a single working air volume, reducing pressure in the cavity 26 of the bellow 22. The valves 46F,46G,46H may be opened at any time during operation of the vehicle when it is desired to reduce the pressure in the cavity 26 of the bellow 22 of the other air spring assemblies 18B,18C,18D, such that each cavity 28 of the inner piston 20 and the cavity 26 of the bellow 22 of each air spring assembly 18B,18C, 18D is to function as a single working air volume. Additionally, the secondary valve 46E and first valve 46A, as well as the first control valve 50A, may be placed in an open position, and the pump 54 may be activated such that air is pumped through the first control valve 50A, through the first valve 46A, and into the cavity 26, and air also passes through the secondary valve 46E and into the cavity 28, increasing pressure in both cavities 26,28.

Furthermore, the pump 54, and the control valves 50A, 50B or the venting valve 52 may be used in combination with any of the valves 46A,46B,46C,46D to control the pressure in the cavities 26,28 of each of the air spring assemblies 18A,18B,18C,18D. Also, more than one of the valves 46A,46B,46C,46D may be opened simultaneously in combination with the control valves 50A,50B or the venting valve 52 to provide pressure relief to one or more of the air spring assemblies 18A,18B,18C,18D. Furthermore, the pump 54 may also be used in combination with one or more of the valves 46A-46H and the control valve 50A to increase the pressure in the cavities 26,28 of each of the air spring assemblies 18A,18B,18C,18D. In other embodiments, there may be various configurations or arrangements of valves and the pump 54 which are able to control the pressure in the cavities 26,28 of each of the air spring assemblies 18A,18B, 18C,18D, such that the air may be transferred to the reservoir 16 or the atmosphere.

The valves 46A-46H,50A,50B,52,56 as described are electromechanical solenoid type valves, which default to a closed position when they are not energized, and change to an open position when energized. However, it is also within the scope of the invention that the valves 46A-46H,50A, 50B,52,56 may also be mechanical valves, such as a check valve, which default to a closed position, and open when a maximum amount of pressure in the cavities 26,28 is reached.

Figure 4:
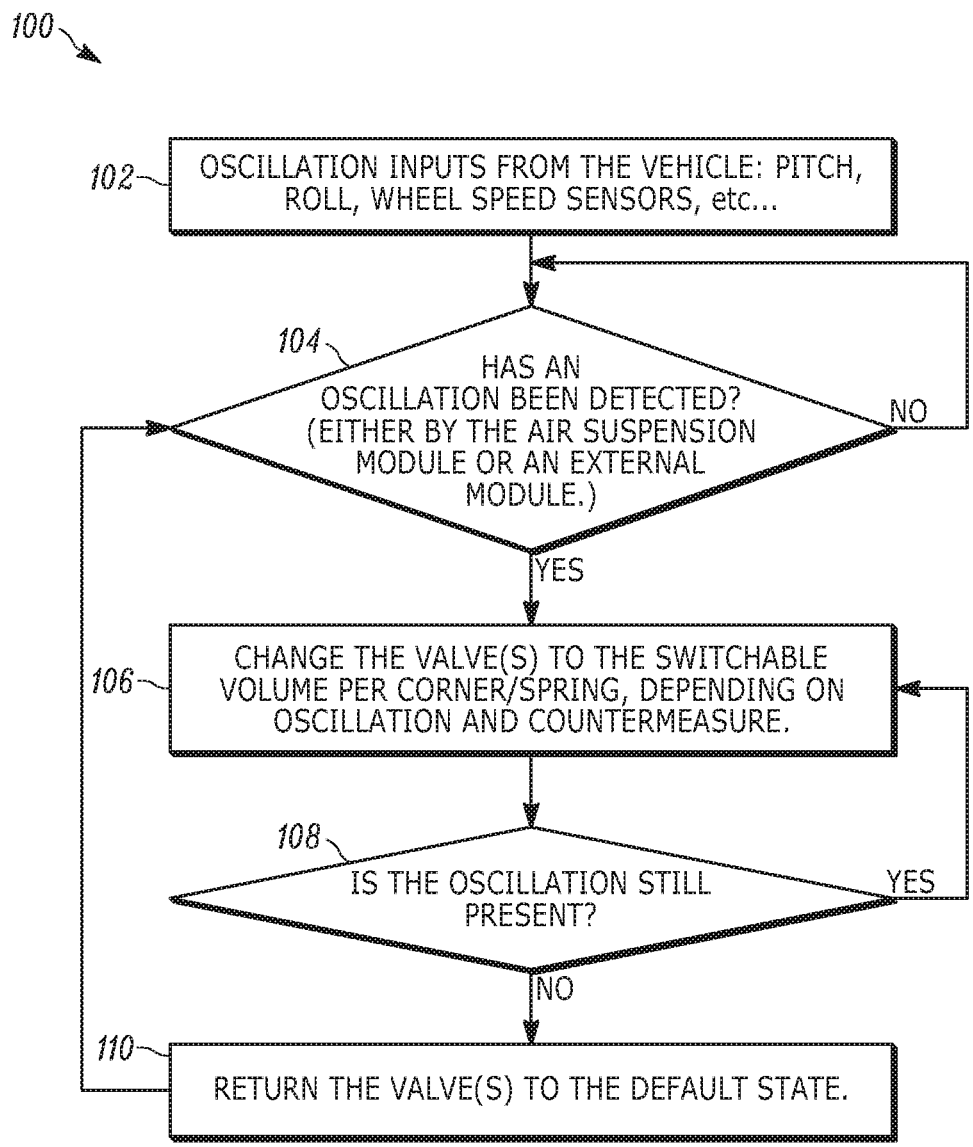
FIG. 4 is a flow diagram of the operation of an air suspension system having a vehicle oscillation reducing function, according to embodiments of the present invention.

A flowchart demonstrating the process by which vehicle oscillation is reduced using the air suspension system 12 of the present invention is shown in FIG. 4, generally at 100. During travel of the vehicle, the air spring assemblies 18A-18D are in a first configuration, or default configuration, having a first spring rate. In step 102, at least one input used, but there may be various inputs, such as vehicle inputs, or other inputs may be used as well. Vehicle inputs may include, but are not limited to, vehicle speed, vehicle acceleration, lateral acceleration, wheel speed, pitch, roll, yaw displacement, yaw rate, wheel acceleration, pitch rate, roll rate, lateral displacement, suspension displacement, and suspension displacement rate. Input may also be from detection devices on the vehicle, such as, but not limited to, LIDAR (Light Imaging, Detection, and Ranging), LADAR (Laser Imaging, Detection, and Ranging), other types of radar, a camera, ultrasound, sonar, or a global positioning system (GPS).

At step 104, the input from step 102 is used to determine whether a vehicle oscillation has been detected. The input may be received by a control unit, which controls the operation of the compressor 14 and the valves 46A-46H, 50A-50B,52,56. If no oscillation has been detected, then step 104 is repeated while continually detecting for vehicle oscillations. If a vehicle oscillation has been detected, at step 106, the working air volume of one or more of the air spring assemblies 18A-18D may be increased or decreased, changing the spring rate from the first spring rate, to a second spring rate. The working air volume may be changed using one or more of the valves 46A-46H, or one or more of the valves 46A-46H in combination with the valves 50A,50B, 52,56 and the compressor 14. More specifically, the various modes of operation as described above may be used to increase or decrease the amount of total air in each air spring assembly 18A-18D using the air compressor 14 and reservoir 16, or to allow for one or both of the cavities 26,28 of each air spring assembly 18A-18D to be used as the working air volume having a desired pressure to change the spring rate of each air spring assembly 18A-18D. The configuration of the air spring assemblies 18A-18D depends on the countermeasure taken, and the type of vehicle oscillation that is being reduced. The second spring rate of the air spring assemblies 18A-18D may by any spring rate necessary to achieve the desired reduction in vehicle oscillation.

In the examples previously mentioned, roll hop occurs when there is an oscillation along the longitudinal axis 120, as indicated by arrow 122 shown in FIG. 1. When roll hop is detected, the working air volume in one or more of the air springs 18A-18D is changed, therefore changing the spring rate, to eliminate the roll hop. Trailer sway occurs when there is an oscillation around the yaw axis 124, indicated by the arrow 126 in FIG. 1. When trailer sway is detected, the working air volume in one or more of the air springs 18A-18D is changed, such that the spring rate is changed to have an effect on cornering stiffness, and eliminate the trailer sway. Powerhop occurs when there is torsional oscillation in the vehicle driveline. More specifically, powerhop occurs when there is torsional oscillation about an axis 132, such as the axis 132 of the rear axle, as indicated by the arrow 134 in FIG. 1. When powerhop is detected, the working air volume in one or more of the air springs 18A-18D is changed to change the spring rate, eliminating the powerhop. Pitch oscillation occurs when there is oscillation around the lateral axis 128 of the vehicle, as indicated by arrow 130 in FIG. 1. When pitch oscillation is detected, the working air volume in one or more of the air springs 18A-18D is changed to change the spring rate, to eliminate the pitch oscillation.

The next step is step 108, where a determination is made as to whether the vehicle oscillation is still present. If the vehicle oscillation is still present, then step 106 is repeated until the oscillation is reduced to an acceptable level, or eliminated completely.

If the oscillation has been reduced to an acceptable level, or eliminated, then at step 110, the air spring assemblies 18A-18D are reconfigured to be operating at the first spring rate, unless it is necessary to for the air spring assemblies 18A-18D to maintain the second spring rate such that the vehicle oscillation remains below an acceptable level.

While it has been described above that each air spring 18A-18D has two cavities 26,28, it is within the scope of the invention that the air springs 18A-18D may have more than two volumes, or include a variable air volume cavity. Furthermore, during step 106, which may be repeated if necessary as described above, one or more of the air spring assemblies 18A-18D may be configured in different ways using the various air volumes to achieve the desired reduction in vehicle oscillation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus comprising:
    an air suspension system of a vehicle having a vehicle oscillation function, the air suspension system, comprising:
        at least one air spring assembly having a plurality of spring rates;
        a plurality of cavities being part of the at least one air spring assembly;
        at least one valve operable for placing one or more cavities of the plurality of cavities in fluid communication with one another;
        a compressor; and
        at least one additional valve in fluid communication with the at least one or more cavities of the plurality of cavities and the compressor,
    wherein during travel of the vehicle, the at least one air spring assembly is operating at a first spring rate, and the at least one air spring assembly is configured for operating at a second spring rate upon detection of a vehicle oscillation, and
    wherein the compressor is used with the at least one valve and the at least one additional valve to control pressure in the plurality of cavities, configuring the at least one air spring assembly to operate at the second spring rate.

2. The apparatus of claim 1, wherein the second spring rate is higher than the first spring rate.

3. The apparatus of claim 1, wherein the second spring rate is lower than the first spring rate.

4. The apparatus of claim 1, further comprising a plurality of inputs,
    wherein a magnitude of the second spring rate is based on one or more inputs of the plurality of inputs.

5. The apparatus of claim 4, wherein the plurality of inputs comprises one or more vehicle inputs.

6. The apparatus of claim 5, wherein the one or more vehicle inputs further comprises one input selected from the group consisting of vehicle speed, vehicle acceleration, lateral acceleration, wheel speed, pitch, roll, yaw displacement, yaw rate, wheel acceleration, pitch rate, roll rate, lateral displacement, suspension displacement, and suspension displacement rate.

7. A method for controlling vehicle oscillation in a vehicle using an air suspension system, the method comprising:
    providing at least one air spring assembly having a plurality of cavities;
    providing at least one valve in fluid communication with two or more cavities of the plurality of cavities;
    providing a compressor;
    providing at least one additional valve in fluid communication with the two or more cavities of the plurality of cavities and the compressor;
    configuring the at least one air spring assembly to operate at a first spring rate;
    determining at least one vehicle oscillation during travel of the vehicle;
    configuring the at least one valve to operate at a second spring rate upon detection of the at least one vehicle oscillation, such that the at least one vehicle oscillation is reduced or eliminated; and
    controlling pressure in the plurality of cavities with the compressor, the at least one valve, and the at least one additional valve, configuring the at least one air spring assembly to operate at a second spring rate.

8. The method of claim 7, wherein the second spring rate is higher than the first spring rate.

9. The method of claim 7, wherein the second spring rate is lower than the first spring rate.

10. The method of claim 7, further comprising:
   providing a plurality of inputs;
   providing a magnitude of the second spring rate to be based on one or more inputs of the plurality of inputs.

11. The method of claim 7, wherein the plurality of inputs comprises one or more vehicle inputs.

12. The method of claim 11, wherein the one or more vehicle inputs comprises one input selected from the group consisting of vehicle speed, vehicle acceleration, lateral acceleration, wheel speed, pitch, roll, yaw displacement, yaw rate, wheel acceleration, pitch rate, roll rate, lateral displacement, suspension displacement, and suspension displacement rate.

* * * * *